United States Patent
Naruse

(10) Patent No.: US 11,316,988 B2
(45) Date of Patent: *Apr. 26, 2022

(54) COMMUNICATION APPARATUS USING AN ADVERTISING SIGNAL, METHOD OF CONTROLLING THE SAME, AND STORAGE MEDIUM

(71) Applicant: CANON KABUSHIKI KAISHA, Tokyo (JP)

(72) Inventor: Taketomo Naruse, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,658

(22) Filed: Oct. 5, 2020

(65) Prior Publication Data
US 2021/0021721 A1 Jan. 21, 2021

Related U.S. Application Data

(63) Continuation of application No. 16/574,181, filed on Sep. 18, 2019, now Pat. No. 10,834,274, which is a
(Continued)

(30) Foreign Application Priority Data

Feb. 13, 2015 (JP) .............................. JP2015-026970

(51) Int. Cl.
*G06F 3/12* (2006.01)
*H04W 4/80* (2018.01)
(Continued)

(52) U.S. Cl.
CPC ......... *H04N 1/00347* (2013.01); *G06F 3/121* (2013.01); *G06F 3/1207* (2013.01);
(Continued)

(58) Field of Classification Search
CPC ........... H04N 1/00347; H04N 1/00893; H04N 1/00899; H04N 2201/0094;
(Continued)

(56) References Cited

U.S. PATENT DOCUMENTS 8,478,300 B2 7/2013 Kuehnel et al.
8,896,874 B2 11/2014 Inoue
(Continued)

FOREIGN PATENT DOCUMENTS

CN 104053194 A 9/2014
JP 2000-293337 A 10/2000
(Continued)

OTHER PUBLICATIONS

European Search Report dated Apr. 29, 2016, in European Patent Application No. 160000056.8.
(Continued)

*Primary Examiner* — Juan M Guillermety
(74) *Attorney, Agent, or Firm* — Venable LLP

(57) ABSTRACT

An apparatus that executes a job, broadcasts a wireless signal prior to establishing a connection by wireless communication with an external apparatus. The wireless signal includes information relating to the apparatus, by which it can be identified whether execution of a job by the apparatus is possible, in a predetermined packet.

23 Claims, 11 Drawing Sheets

Related U.S. Application Data continuation of application No. 15/890,600, filed on Feb. 7, 2018, now Pat. No. 10,491,762, which is a continuation of application No. 15/005,208, filed on Jan. 25, 2016, now abandoned.

(51) Int. Cl.
    *H04N 1/00*         (2006.01)
    *H04W 8/00*         (2009.01)

(52) U.S. Cl.
    CPC .......... *G06F 3/1232* (2013.01); *G06F 3/1236* (2013.01); *G06F 3/1292* (2013.01); *H04N 1/00893* (2013.01); *H04N 1/00899* (2013.01); *H04W 4/80* (2018.02); *H04N 2201/006* (2013.01); *H04N 2201/0072* (2013.01); *H04N 2201/0094* (2013.01); *H04W 8/005* (2013.01); *Y02D 30/70* (2020.08)

(58) Field of Classification Search
    CPC .... H04N 2201/0072; H04N 2201/006; H04W 4/80; H04W 8/005; H04W 76/19; H04W 76/23; H04W 76/14; G06F 3/1207; G06F 3/121; G06F 3/1236; G06F 3/1232; G06F 3/1292; Y02D 30/70
    See application file for complete search history.

(56) References Cited

U.S. PATENT DOCUMENTS

| | | | |
|---|---|---|---|
| 9,094,780 | B2 | 7/2015 | Naruse |
| 9,288,759 | B2 | 3/2016 | Kerai et al. |
| 10,491,762 | B2 * | 11/2019 | Naruse ................... G06F 3/1236 |
| 10,834,274 | B2 * | 11/2020 | Naruse ................... G06F 3/1236 |
| 2005/0141018 | A1 | 6/2005 | Oak et al. |
| 2006/0265473 | A1 | 11/2006 | Muto |
| 2007/0234057 | A1 | 10/2007 | Miyazawa |
| 2008/0069097 | A1 | 3/2008 | Motegi |
| 2009/0234728 | A1 | 9/2009 | Willuns et al. |
| 2010/0226662 | A1 | 9/2010 | Takatani |
| 2013/0065584 | A1 * | 3/2013 | Lyon ..................... H04W 28/06 455/434 |
| 2013/0163043 | A1 | 6/2013 | Suzuki |
| 2013/0165044 | A1 | 6/2013 | Xie et al. |
| 2013/0201503 | A1 | 8/2013 | Miller et al. |
| 2013/0229673 | A1 | 9/2013 | Nakayama et al. |
| 2013/0229685 | A1 | 9/2013 | Naruse |
| 2013/0326495 | A1 | 12/2013 | Reunamaki et al. |
| 2014/0078540 | A1 | 3/2014 | Ishida |
| 2014/0098393 | A1 | 4/2014 | Kim |
| 2014/0114782 | A1 | 4/2014 | Cloin et al. |
| 2014/0176984 | A1 | 6/2014 | Nakayama |
| 2014/0289400 | A1 | 9/2014 | Saito |
| 2014/0349577 | A1 | 11/2014 | Matsuda |
| 2014/0355048 | A1 * | 12/2014 | Kang ..................... G06F 3/1229 358/1.15 |
| 2015/0002872 | A1 | 1/2015 | Naruse |
| 2015/0002879 | A1 | 1/2015 | Naruse |
| 2015/0031302 | A1 | 1/2015 | Kawasaki |
| 2015/0044970 | A1 | 2/2015 | Park et al. |
| 2015/0062611 | A1 | 3/2015 | Yamakawa |
| 2015/0169269 | A1 | 6/2015 | Ueda |
| 2015/0172391 | A1 | 6/2015 | Kasslin et al. |
| 2015/0189023 | A1 | 7/2015 | Kubota et al. |
| 2015/0195008 | A1 | 7/2015 | Johnson et al. |
| 2015/0234620 | A1 | 8/2015 | Terashima et al. |
| 2015/0288832 | A1 | 10/2015 | Naruse |
| 2015/0296416 | A1 * | 10/2015 | Lee ....................... H04W 8/005 370/331 |
| 2016/0095047 | A1 | 3/2016 | Lee et al. |
| 2016/0100311 | A1 | 4/2016 | Kumar |
| 2016/0127600 | A1 * | 5/2016 | Beatty .................... H04W 4/80 358/1.15 |
| 2016/0128112 | A1 | 5/2016 | Dunsbergen et al. |
| 2017/0134609 | A1 * | 5/2017 | Park ........................ G06F 3/12 |
| 2017/0251469 | A1 | 8/2017 | Lee et al. |

FOREIGN PATENT DOCUMENTS

| | | |
|---|---|---|
| JP | 2002-182886 A | 6/2002 |
| JP | 2009-017369 A | 1/2009 |
| JP | 2009-100322 A | 5/2009 |
| JP | 2009-521190 A | 5/2009 |
| JP | 2012-142877 A | 7/2012 |
| JP | 2012-533958 A | 12/2012 |
| JP | 2014-120804 A | 6/2014 |
| WO | 2013/126747 A2 | 8/2013 |
| WO | 2013/181778 A1 | 12/2013 |
| WO | 2013/184440 A2 | 12/2013 |
| WO | 2014/087192 A1 | 6/2014 |

OTHER PUBLICATIONS

European Search Report dated Jul. 2, 2018, in related European Patent Application No. 18000192.7.
Japanese Office Action dated Jan. 25, 2019, in related Japanese Patent Application No. 2015-026970.
Chinese Office Action dated Mar. 4, 2019, in related Chinese Patent Application No. 201610076523.3 (with English translation).

* cited by examiner

FIG. 6A

ADVERTISEMENT PACKET

| HEADER (2BYTE) | PAYLOAD (SIZE DEFINED IN HEADER) | | | | | |
|---|---|---|---|---|---|---|
| 601 | 602 | | | | | |
| | MFP NAME | CAPABILITY INFORMATION | SETTING INFORMATION | ERROR INFORMATION | NEXT Flag | Tx Power |
| | 603 | 604 | 605 | 606 | 607 | 608 |
| | | | | | 627 | |

CONNECTION-TO-MFP INFORMATION

FIG. 6B

CAPABILITY INFORMATION

| MAKER | MODEL NUMBER | COLOR | NUMBER OF INKS | SUPPORTED SHEET SIZES | SUPPORTED SHEET TYPES | DOUBLE-SIDED SUPPORTED |
|---|---|---|---|---|---|---|
| 00000001 | 10101001 | 11 | 1001111 | 00111111 | 00111111 | 1 |
| 609 | 610 | 611 | 612 | 613 | 614 | 615 |
| | | 0:MONOCHROME 1:COLOR | 0:BLACK 1:CYAN 2:MAGENTA 3:YELLOW 4:ORANGE 5:GREEN 6:GRAY | 0:A2 1:A3 2:A4 3:A5 4:B4 5:B3 6:Legal 7:Letter | 0:NORMAL PAPER 1:RECYCLED PAPER 2:PHOTO PAPER 3:POSTCARD 4:MATTE PAPER 5:BOTH SIDES PHOTO PAPER 6:SEAL PAPER 7:POSTER BOARD | 0:NO 1:YES |

FIG. 6C
SETTING INFORMATION

| FIRST CASSETTE SHEET SIZE 616 | SECOND CASSETTE SHEET SIZE 617 | FIRST CASSETTE SHEET TYPE 618 | SECOND CASSETTE SHEET TYPE 619 | PRIORITY CASSETTE 620 | PRINT MODE 621 | PRINTING SPEED 622 |
|---|---|---|---|---|---|---|
| 00001000 | 00000100 | 00001000 | 00000100 | 1 | 0010 | 101111 |

FIG. 6D
ERROR INFORMATION

| JOB STATUS 623 | JOB ERROR 624 | RECOVERABLE ERROR 625 | FATAL ERROR 626 |
|---|---|---|---|
| 000100111110011 | 00000000 | 01000000 | 00000 |

0:NUMBER OF RECEIVED JOBS
1:NUMBER OF RECEIVED PAGES
2:NUMBER OF USERS IN VICINITY

0:SHEET SIZE MISMATCH
1:SHEET TYPE MISMATCH
2:IMAGE DECODING ERROR
3:PACKET ERROR
4:COLOR MISMATCH
5:IMPOSITION ERROR
6:UNSUPPORTED PROCESSING
7:OTHER

0:CONVEYING UNIT PAPER JAM
1:SHEET FEEDING UNIT PAPER JAM
2:SHEET TRAY FULL
3:DISCHARGING PORT CLOSED
4:COVER OPEN
5:INK OUTAGE
6:INK REMAINING AMOUNT LOW
7:OTHER

0:WASTE INK TANK FULL
1:PRINTING UNIT HIGH TEMPERATURE ERROR
2:INK CIRCULATION ERROR
3:POWER SOURCE ERROR
4:OTHER

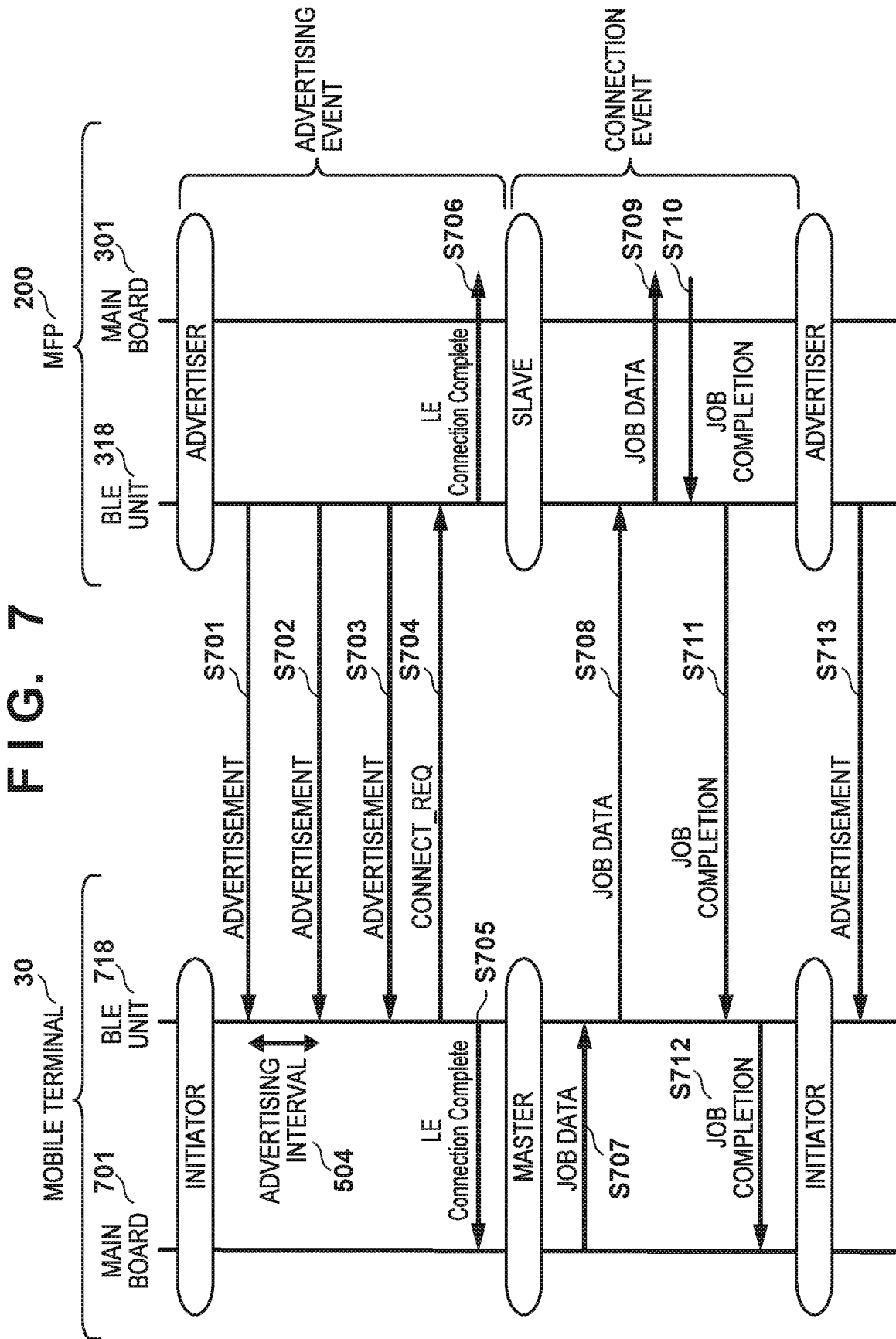

FIG. 8A

SEARCH FOR PRINTER MEETING CONDITION

☐ COLOR

☑ A4 SIZE OR GREATER

☑ 15 PPM OR GREATER

FIG. 8B

FOUND THE FOLLOWING PRINTERS

| | | | |
|---|---|---|---|
| ▪ PRINTER A | PAPER JAM ERROR | DISTANCE: 10m | |
| ▪ MFP B | GOOD, PAPER = A4 | DISTANCE: 30m | CONNECT 801 |
| ▪ PRINTER C | INK LOW, PAPER = A3 | DISTANCE: 50m | CONNECT |

COMMUNICATION APPARATUS USING AN ADVERTISING SIGNAL, METHOD OF CONTROLLING THE SAME, AND STORAGE MEDIUM

This application is a continuation of application Ser. No. 16/574,181, filed Sep. 18, 2019, which is a continuation application is a continuation of application Ser. No. 15/890,600, filed Feb. 7, 2018, now U.S. Pat. No. 10,491,762, issued Nov. 26, 2019, which is a continuation of application Ser. No. 15/005,208, filed Jan. 25, 2016.

BACKGROUND OF THE INVENTION

Field of the Invention

The present invention relates to a processing technique that processes a job received via a communication unit.

Description of the Related Art

In recent years, in the Bluetooth (registered trademark) Core Specification V4.0, a very low power consumption wireless communication standard called Bluetooth Low Energy (hereinafter referred to as BLE) has been established. In BLE, extended operation using a battery such as a button battery is envisioned. In BLE, a new child node notifies its own existence to a parent node by intermittently broadcasting an advertisement packet. A child node can control the timing of advertisement packet broadcasting and the timing of reception of packets from a parent node, and power consumption is significantly reduced by entering a sleep state during other times.

In a case where a parent node is a mobile terminal such as a smart phone and a child node is an image processing apparatus such as a printer, the mobile terminal becomes a central and the image processing apparatus becomes a peripheral. The image processing apparatus, by an advertising communication scheme, broadcasts advertisement packets intermittently, and the mobile terminal can recognize the existence of the image processing apparatus by acquiring the advertisement packets.

Here, when the mobile terminal acquires an advertisement packet, it can establish a connection with the image processing apparatus, query the capabilities of the image processing apparatus, and execute a function that the image processing apparatus has. For example, in a case where the image processing apparatus has a print function, and is in a state in which it can execute a job, the mobile terminal can establish a connection with the image processing apparatus, and issue a print job to the image processing apparatus.

However, even in a state in which the image processing apparatus cannot execute printing, the image processing apparatus cannot broadcast an advertisement packet while the connection is established between the mobile terminal and the image processing apparatus. For this reason, there is a problem in that while a mobile terminal is in communication with an image processing apparatus, a user of another mobile terminal cannot recognize the existence of the image processing apparatus.

SUMMARY OF THE INVENTION

The present invention is conceived in view of the foregoing problem, and provides a technique by which it is possible to improve efficiency of usage of a system that implements processing between a plurality of apparatuses.

According to one aspect of the present invention, there is provided an apparatus that executes a job, the apparatus comprises: a broadcast unit configured to broadcast a wireless signal prior to establishing a connection by wireless communication with an external apparatus, wherein the wireless signal includes information relating to the apparatus, by which it can be identified whether execution of a job by the apparatus is possible, in a predetermined packet.

Further features of the present invention will become apparent from the following description of exemplary embodiments (with reference to the attached drawings).

BRIEF DESCRIPTION OF THE DRAWINGS

FIGS. 6A to 6D are views for illustrating a detailed configuration of an advertisement packet.

FIG. 7 is a view for illustrating a processing sequence between the mobile terminal and the MFP.

FIGS. 8A and 8B are views for illustrating an example of displaying by a display unit of the MFP.

DESCRIPTION OF THE EMBODIMENTS

Figure 1:
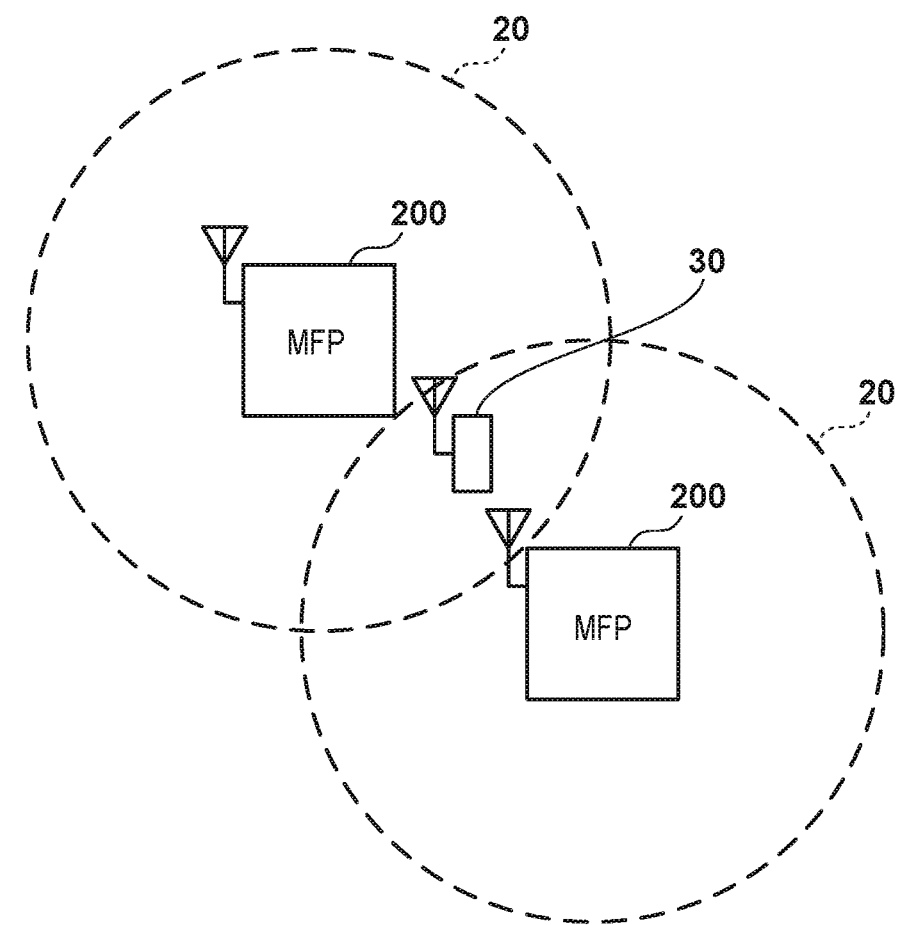
FIG. 1 is a view for illustrating a configuration of MFPs and a mobile terminal.

Embodiments of the present invention will be described hereinafter in detail, with reference to the accompanying drawings. Note that the embodiments below do not limit the present invention according to the scope of the claims, and the means for solving in the present invention is not limited to requiring a combination of all features explained in the present embodiment. For identical elements identical reference numerals are given, and detailed explanation therefor is omitted.

First Embodiment

FIG. 1 is a pattern diagram illustrating an image processing apparatus, and a surrounding environment thereof.

In the present embodiment, explanation is given for a system including the image processing apparatus and a terminal device. Exemplary explanation is given using a Multifunction Printer (MFP) as an example of an image processing apparatus in the present embodiment. An MFP 200 is an MFP of an ink-jet method that has a plurality of functions such as a print function, a scanner function (reading function), a copy function, a fax function, or the like. Note that the print method that the MFP 200 uses is not limited to the ink-jet method, and it is possible to use another print method such as a laser beam method. Also, the image processing apparatus is not limited to this, and may have only a print function, may have only a scanner function, and may comprise other functions.

The MFP 200 operates as a BLE peripheral which is one short-range wireless communication specification. Also, the MFP 200 can transmit an advertising signal to its periphery without making a network connection with a particular terminal.

A mobile terminal 30, which is a terminal device, operates as a central which is a BLE central node. The mobile terminal 30, for example, is a terminal that can be carried, and can transmit to the MFP 200 a print job. The mobile terminal 30 may be an information processing apparatus that handles a file that is a printing target such as a cellular phone, a digital camera, a smart phone or the like, but the mobile terminal 30 is not limited to these. The mobile terminal 30, if positioned within a signal area 20 which is an effective communication range of the MFP 200, can receive an advertising signal (an advertisement packet) from the MFP 200. Accordingly, the mobile terminal 30 is able to receive advertising signals of a plurality of the MFP 200 if within the effective communication ranges of a plurality of the MFP 200 (in the case of FIG. 1, 2 of the MFP 200). Also, as a characteristic of BLE, because the MFP 200 can receive a signal strength of an advertising signal that the MFP 200 transmitted, a central can identify an approximate distance to a peripheral.

Note that the signal area 20, which is an effective communication range is a range over which the MFP 200 can communicate, is a communication range in which short-range wireless communication which is of a shorter communication range than that of long-range wireless communication such as Wireless Local Area Network (WLAN) (a shorter communication range than a predetermined distance) is realized. Also, it can be said that the MFP 200 and the mobile terminal 30 function as communication apparatuses, meaning that the apparatuses communicate with each other.

Figure 2A:
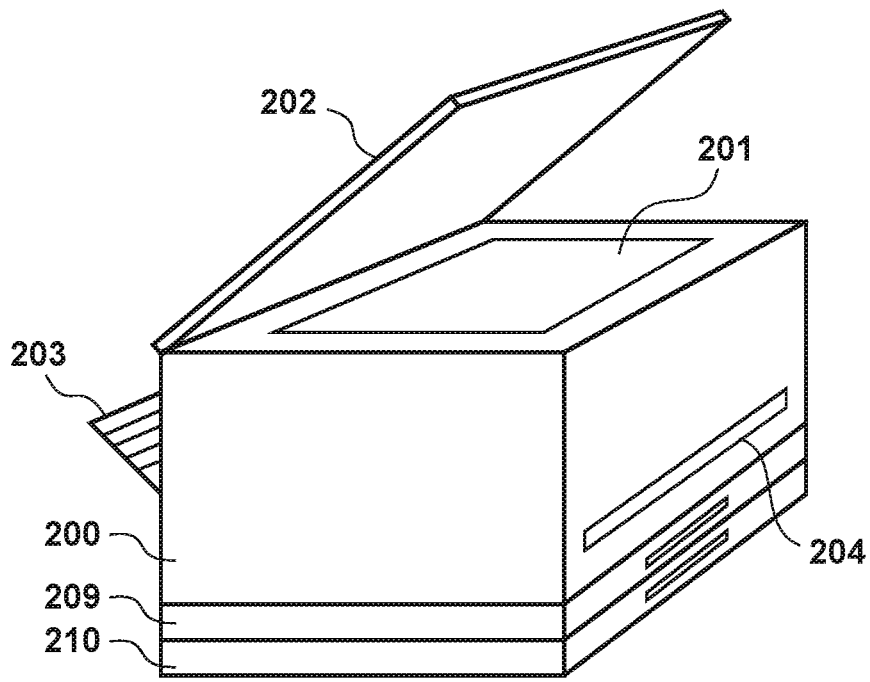
FIGS. 2A and 2B are perspective views of an MFP.
Figure 2B:
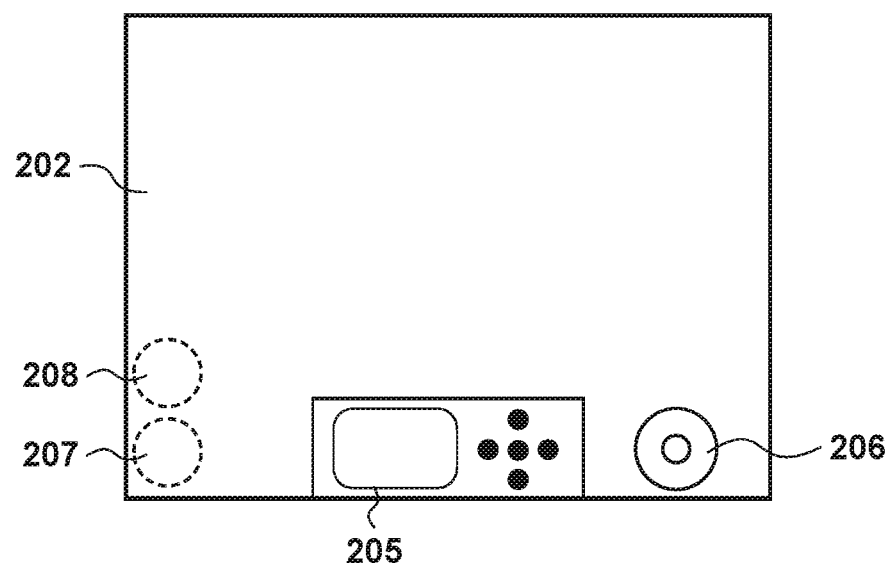

FIGS. 2A and 2B are views for illustrating an outer appearance of the MFP 200, and in particular, FIG. 2A is a perspective view of the MFP 200, and FIG. 2B is a top view of the MFP 200.

An original platen 201 is a transparent base comprised of glass or the like, and is used when an original is placed on it and read by the scanner. An original lid 202 is a lid for making it so that scanning light does not escape to the outside when performing reading by the scanner. A printing sheet insertion port 203 is an insertion port for setting sheets of various sizes as a recording medium. The sheet set in the printing sheet insertion port 203 is conveyed to the printing unit one sheet at a time, a desired print is performed thereon, and it is discharged from a printing sheet discharging port 204. Also, the MFP 200 comprises a first cassette 209 and a second cassette 210 as other print sheet supply units. For example, if A3 sheets are set in the first cassette 209, and A4 sheets are set in the second cassette 210, a user can execute print jobs whose print sizes are A3 and A4 without changing the sheets of the MFP 200.

On an upper portion of the original lid 202, an operation display unit 205 and an Near Field Communication (NFC) unit 206 are arranged. The operation display unit 205 has a display unit for displaying images, operation menus or the like, 4-direction keys used for cursor movement on the display unit, buttons, and a console unit for executing other various functions. Also, the operation display unit 205 may be comprised by a touch panel.

The NFC unit 206 is a unit for performing short-range wireless communication, and is in a location at which a terminal with which the short-range wireless communication is performed is actually caused to approach. The NFC unit 206 can perform communication by a terminal having an NFC communication function being caused to approach within a predetermined distance (approximately 10 cm). A WLAN antenna 207 is an antenna for communicating by WLAN. A BT antenna 208 is an antenna for communicating by Bluetooth and BLE.

Figure 3A:
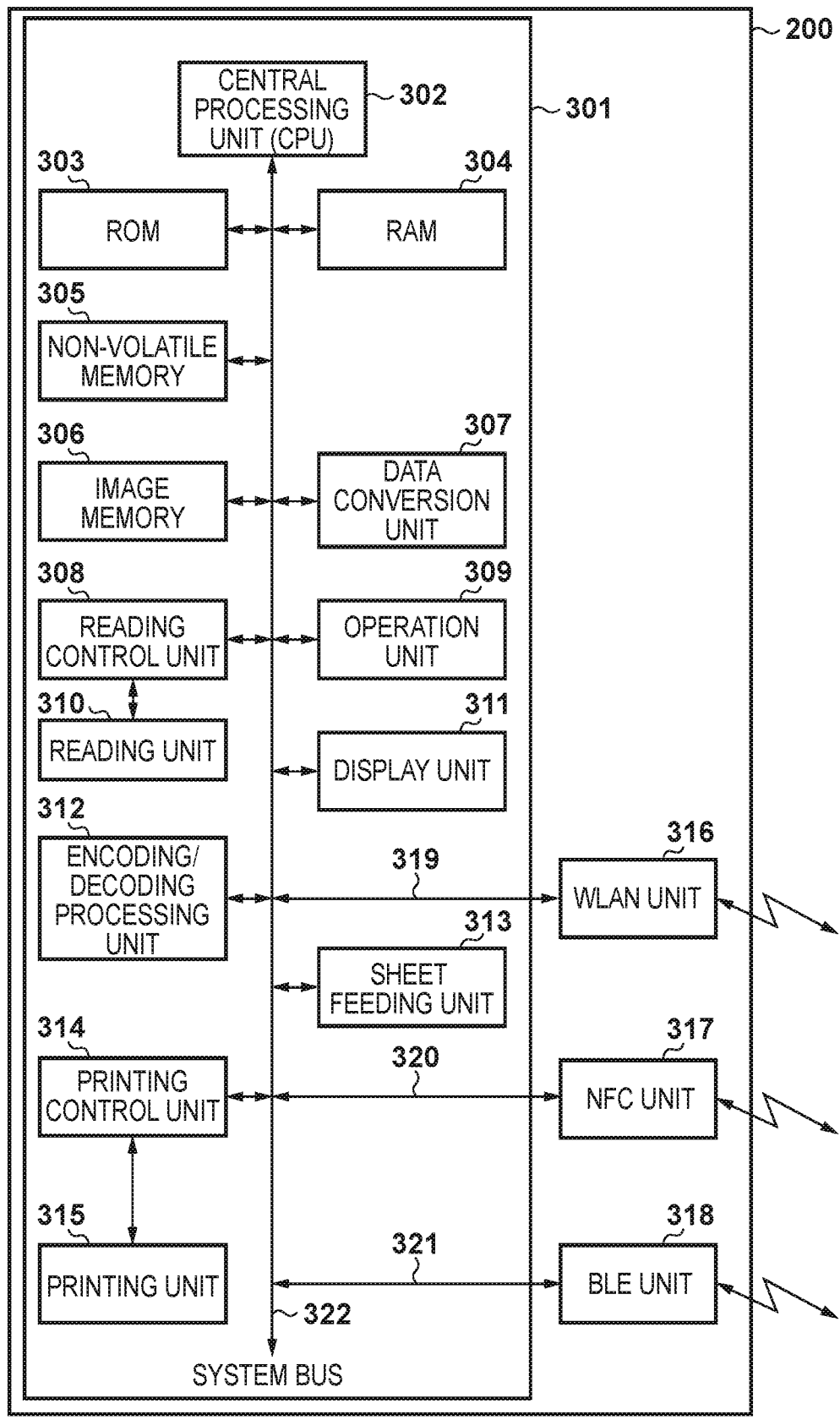
FIG. 3A is a block diagram for illustrating a control configuration of the MFP.

FIG. 3A is a block diagram for illustrating a control configuration of the MFP 200.

The MFP 200 comprises a main board 301 for performing main control of the apparatus, a WLAN unit 316 for performing WLAN communication, an NFC unit 317 for performing NFC communication, and a BLE unit 318 for performing Bluetooth communication and BLE communication.

In the main board 301, a Central Processing Unit (CPU) 302 is a system control unit that controls the MFP 200 on the whole. A Read Only Memory (ROM) 303 stores various programs such as control programs that the CPU 302 executes, an embedded operating system (OS) program, or the like. In the present embodiment, software control such as scheduling, task switching or the like is performed under the management of the embedded OS stored in the ROM 303 for control programs stored in the ROM 303. A Random Access Memory (RAM) 304 is configured by an SRAM (static RAM) memory or the like, and in addition to storing program control variables, setting values that a user registers, and various data such as management data of the MFP 200, various work buffer regions are arranged.

A non-volatile memory 305 is configured by a memory such as a flash memory, and holds data that is stored even when a power source is turned off. Specifically, in this data there is user data such as a FAX telephone number, a communication history, network information, or the like, a list of mobile terminals connected to in the past, and setting information of the MFP 200 such as menu items of a print mode, and inkjet printhead correction information or the like. An image memory 306 is configured by a memory such as a DRAM (dynamic RAM), and stores various data such as image data received via each communication unit, image data processed by an encoding/decoding processing unit 312, or the like.

Note that a memory configuration comprising the various foregoing memories is not limited to this, and it is possible to configure as appropriate the number, characteristics, storage capacities or the like of these in accordance with purpose and objectives.

A data conversion unit 307 performs processing such as analysis of page description language (the PDL) data, or the like, conversion from image data to print data, or the like. A reading control unit 308 optically reads an original in accordance with a reading unit 310 configured by a CIS image sensor (e.g., a contact image sensor) or the like, and outputs image data. Specifically, an original is optically read by the reading unit 310, various image processing such as binarization processing or halftone processing is applied via an image processing control unit (not shown) to an image signal converted into electronic image data, and high definition image data is outputted.

An operation unit 309 and a display unit 311 correspond to the operation display unit 205 of FIG. 2B. The encoding/decoding processing unit 312 performs various processing such as encoding/decoding processing, resizing processing or the like of image data (the JPEG, PNG, or the like) processed by the MFP 200. A sheet feeding unit 313 holds sheets for printing, and supplies sheets to a printing unit 315. Here, the sheet feeding unit 313 collectively refers to a plurality of sheet feeding units such as the printing sheet insertion port 203, the first cassette 209, and the second cassette 210 of FIG. 2A. By control from a printing control unit 314, it is possible to perform sheet feeding from the sheet feeding unit 313 to the printing unit 315. Also, by the printing control unit 314, it is possible to control what sheet feeding unit of the plurality of sheet feeding units to perform sheet feeding from.

The printing control unit 314 converts image data that is the target of the printing into high definition image data by applying various image processing such as smoothing processing, print density correction processing, and color correction via the image processing control unit (not shown), and outputs to the printing unit 315. Also, the printing control unit 314 periodically reads various information such as a status of the printing unit 315, and updates information in the RAM 304. Specifically, it updates, for example, remaining amounts of ink tanks, print head states, or the like.

In the MFP 200 there are the WLAN unit 316, the NFC unit 317 and the BLE unit 318 as communication units for wireless communication, and it is possible to perform wireless communication in accordance with 3 types of communication specifications (WLAN, NFC, and BLE). Specifically, the WLAN unit 316, the NFC unit 317, and the BLE unit 318 are units for realizing communication in compliance with WLAN, NFC and BLE specifications respectively. The BLE unit 318 is a unit that used for both classical Bluetooth and BLE. The WLAN unit 316, the NFC unit 317, and the BLE unit 318 are communication units for performing data communication with other devices such as mobile terminals. These communication units convert data into packets and perform packet transmission to other devices. Meanwhile, these communication units convert packets from other external devices into data and transmit the data to the CPU 302.

The WLAN unit 316, the NFC unit 317, and the BLE unit 318 are connected to a system bus 322 via bus cables 319, 320 and 321 respectively.

Note that the foregoing various components 303-318 are connected to each other via the system bus 322 which the CPU 302 manages.

Figure 3B:
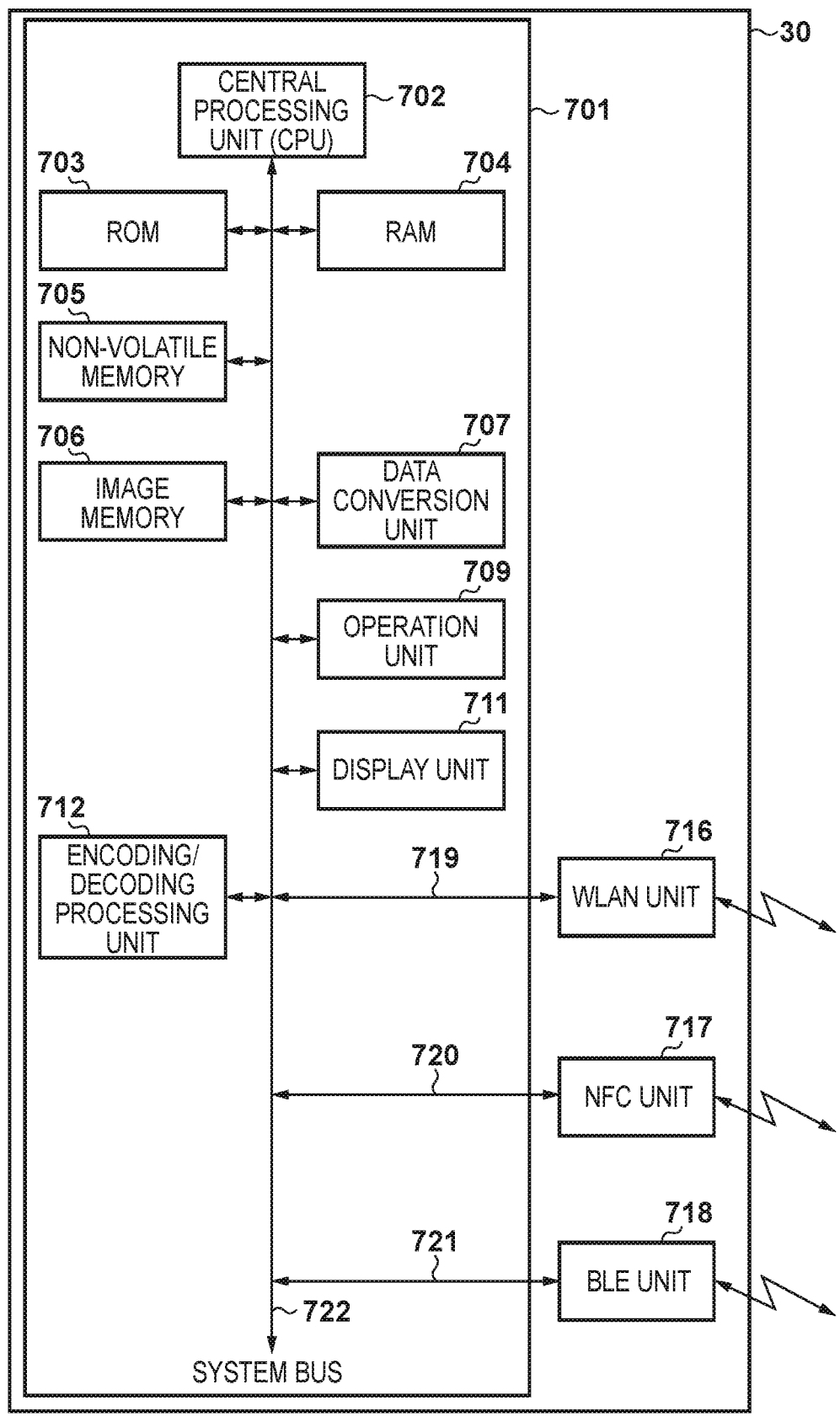
FIG. 3B is a block diagram for illustrating a control configuration of the mobile terminal.

FIG. 3B is a block diagram for illustrating a control configuration of the mobile terminal 30.

The mobile terminal 30 comprises a main board 701 for performing main control of the apparatus, a WLAN unit 716 for performing WLAN communication, an NFC unit 717 for performing NFC communication, and a BLE unit 718 for performing classical Bluetooth communication and BLE communication.

In the main board 701, a CPU 702 is a system control unit that controls the mobile terminal 30 on the whole. A ROM 703 stores various programs such as control programs that the CPU 702 executes, an embedded operating system (OS) program, or the like. In the present embodiment, software control such as scheduling, task switching or the like is performed under the management of the embedded OS stored in the ROM 703 for control programs stored in the ROM 703. A RAM 704 is configured by an SRAM (static RAM) memory or the like, and in addition to storing program control variables, setting values that the user registers, and various data such as management data of the mobile terminal 30, various work buffer regions are arranged.

A non-volatile memory 705 is configured by a memory such as a flash memory, and holds data that is stored even when a power source is turned off. Specifically in such data there is a communication history, user data such as network information, a list of MFPs connected to in the past, and setting information of the mobile terminal 30 such as menu items of a communication mode or the like. An image memory 706 is configured by a memory such as a DRAM (Dynamic RAM), and stores various data such as image data received via each communication unit, image data processed by an encoding/decoding processing unit 712, or the like.

Note that a memory configuration comprising the various foregoing memories is not limited to this, and it is possible to configure as appropriate the number, characteristics, storage capacities or the like of these in accordance with purpose and objectives.

A data conversion unit 707 performs processing for data analysis, conversion from image data to job data, or the like.

An operation unit 709 is configured by a touch panel, keys, buttons or the like for performing operations on the mobile terminal 30. A display unit 711 is configuring by an LCD, for example. The encoding/decoding processing unit 712 performs various processing such as encoding/decoding processing, resizing processing or the like of image data (the JPEG, PNG, or the like) processed by the mobile terminal 30.

In the mobile terminal 30 there are the WLAN unit 716, the NFC unit 717 and the BLE unit 718 as communication units for wireless communication, and it is possible to perform wireless communication in accordance with 3 types of communication specifications (WLAN, NFC, and BLE). Specifically, the WLAN unit 716, the NFC unit 717, and the BLE unit 718 are units for realizing communication in compliance with WLAN, NFC and BLE specifications respectively. The BLE unit 318 is a unit that used for both classical Bluetooth and BLE. The WLAN unit 716, the NFC unit 717, and the BLE unit 718 are communication units for performing data communication with other devices such MFPs. These communication units convert data into packets and perform packet transmission to other devices. Meanwhile, these communication units convert packets from other external devices into data and transmit the data to the CPU 702.

The WLAN unit 716, the NFC unit 717, and the BLE unit 718 are connected to a system bus 722 via bus cables 719, 720 and 721 respectively.

Note that the various foregoing components 703-718 are connected to each other via the system bus 722 which the CPU 702 manages.

Figure 4:
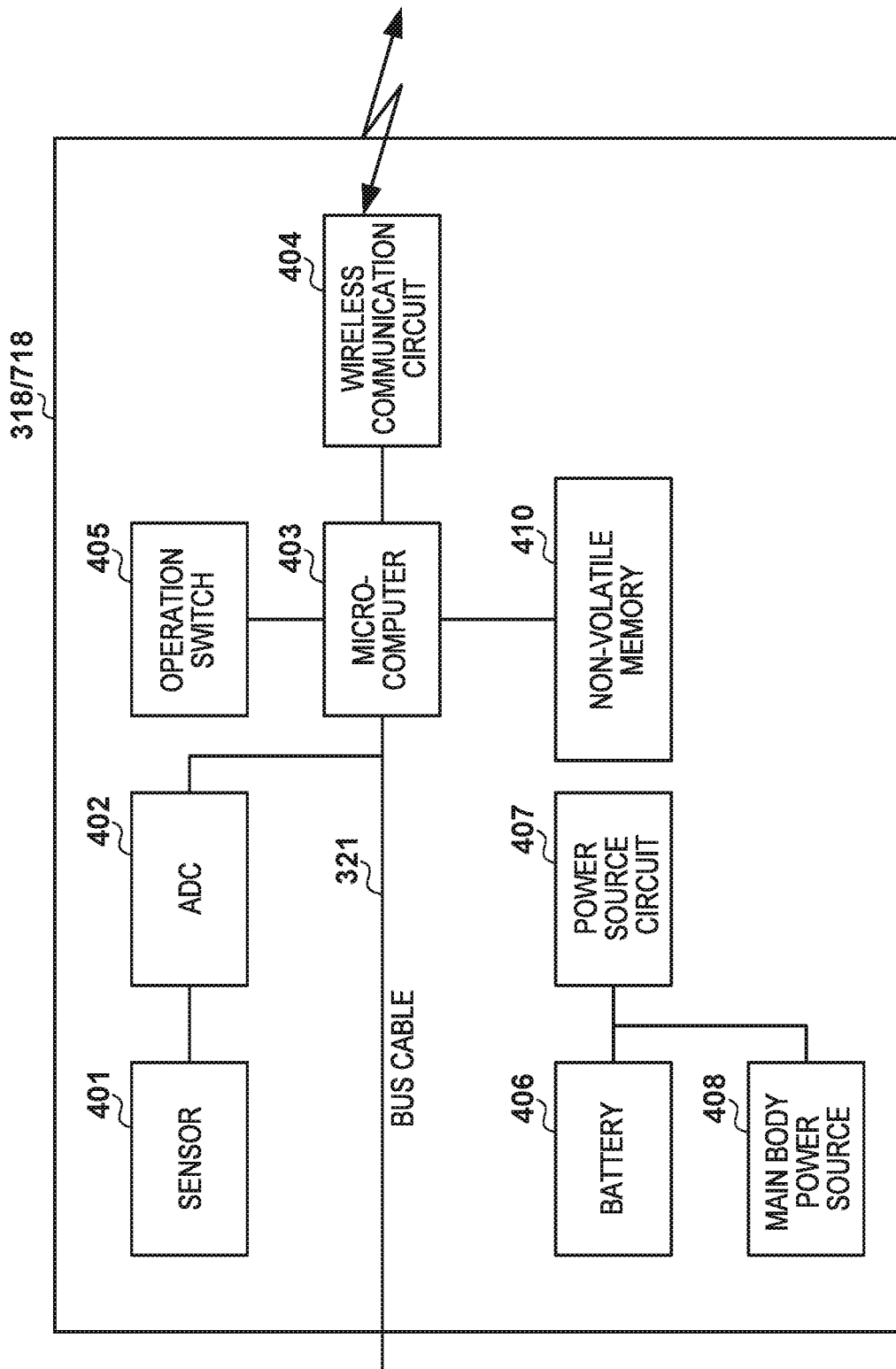
FIG. 4 is a block diagram for illustrating a detailed configuration of a BLE unit.

FIG. 4 is a block diagram for illustrating a detailed configuration of the BLE unit 318 and the BLE unit 718. Below explanation is given with the BLE unit 318 as an example.

Data is transmitted/received between the main board 301 and a microcomputer 403 via the bus cable 321. By attaching an independent sensor in addition to the bus cable 321 it is possible to transmit/receive data by control other than that of the main board 301. In the BLE unit 318, an ADC 402 (Analog-to-Digital Converter) and the microcomputer 403 are connected to the bus cable 321.

A sensor 401 is a device for converting a physical amount of a measurement target into an electrical signal. In the present embodiment, as the sensor 401, there is a monitoring sensor or a motion sensor for identifying that there is a person in the periphery of the MFP 200, for example, and a temperature sensor for monitoring the temperature of the MFP 200.

The ADC 402 is analog/digital conversion circuit that converts an analog signal output from the sensor 401 into a digital signal that the microcomputer 403 can process. The microcomputer 403 is a microprocessor that performs wireless communication processing. In the microcomputer 403, a RAM and a flash memory are comprised. A wireless communication circuit 404 is configured by a device such as a wireless communication chip, a crystal oscillator, an inductor, a condenser, or the like, and performs transmission and reception of data by wireless communication. An operation switch 405 is a switch for turning on and turning off the power of the BLE unit 318, and the operation switch 405 sends a broadcasting signal by selecting ON. Note that a power of the BLE unit 318 ordinarily operates in cooperation with a power source of the MFP 200. In a case where a problem occurs in a power supply system of the MFP 200, it is possible to broadcast independently from the operation of the MFP 200 by turning on the operation switch 405 intentionally by a user operation. A battery 406 is a storage battery such as a button battery. A main body power source 408 is a power source supplied from the main board 301. A power source circuit 407 is a circuit for performing processing such as a voltage adjustment for efficiently supplying a power from the battery 406.

In this way, the MFP 200 has power sources of 2 systems: the battery 406 and the main body power source 408. With this, even if the MFP 200 cannot be activated for some reason, or if the power source of the main board 301 is turned off by a power saving function of the main body of the MFP 200, it is possible to broadcast (i.e., a multi-destination transmission) the advertising signal from the BLE unit 318. Also, in the BLE unit 318 a non-volatile memory 410 is installed, and by moving information such as operation information, setting information or the like that is stored in the RAM 304 of the main board 301, it is possible to perform communication alone using this information as necessary.

Figure 5A:
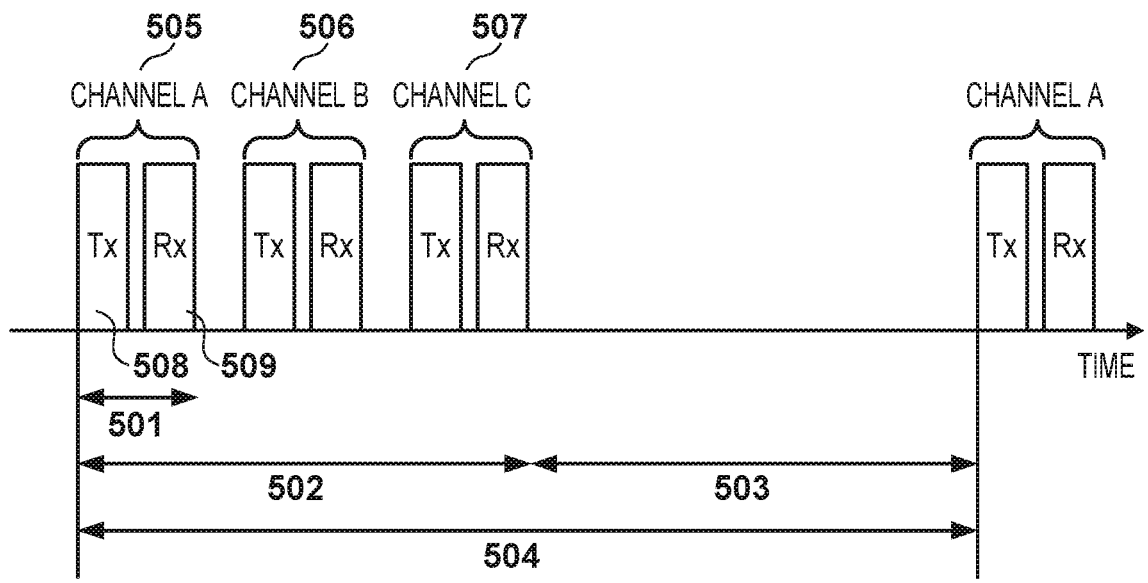
FIGS. 5A to 5C are views for illustrating timing of broadcasting of advertisement packets.
Figure 5B:
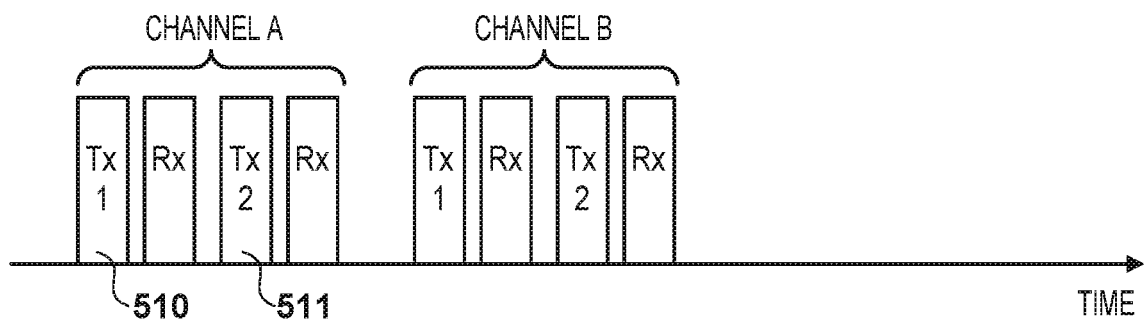
Figure 5C:
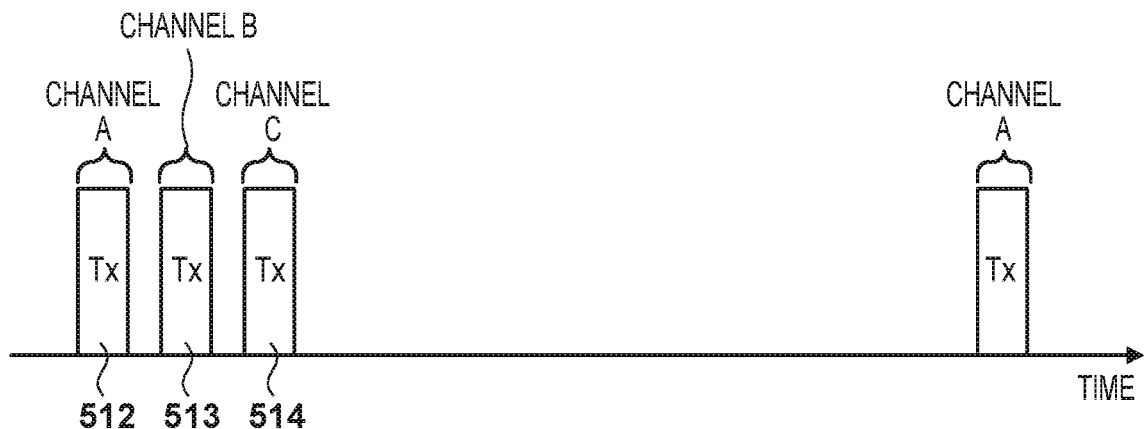

FIGS. 5A to 5C are views for illustrating an advertising signal that the BLE unit 318 broadcasts to its periphery.

FIG. 5A illustrates a normal advertising signal of the MFP 200. Tx 508 represents a transmission section of the advertising signal, and by causing transmission circuit to operate, a predetermined packet (e.g., an advertisement packet) explained with FIGS. 6A to 6D is transmitted. Rx 509 represents a standby section for waiting for a response from a communication partner (for example, the mobile terminal 30) to the advertising signal. Specifically, in the Rx 509, by turning the power source of a reception circuit on, a state in which reception of a response from a communication partner is possible is switched into. Then, after a predetermined amount of time has elapsed, that is outside of the standby section of the Rx 509, by turning off the power source of the reception circuit, a state in which a response cannot be received is switched to. One channel A 505 is formed by the Tx 508 and the Rx 509, and an advertising time 501 is defined by the Tx 508 and the Rx 509 in the channel A 505. Continuing from the channel A 505, a channel B 506 and a channel C 507 of similar configuration are comprised. Also, Tx and Rx are repeated by the number of the determined channels. For example, in the BLE standard, channels 37, 38 and 39 are allocated for advertisement packet channels, and in the present embodiment, the channel A 505, the channel B 506, and the channel C 507 correspond to these channels.

An Active section 502 is a section in which transmission and reception is performed by Tx and Rx. A power-saving section 503 is a section in which transmission and reception is not performed by Tx and Rx. The longer the power-saving section 503 is, the more power consumption of the BLE unit 318 can be suppressed. In this way, a predetermined interval from broadcasting the advertising signal until broadcasting the next advertising signal after waiting for a corresponding response for a predetermined amount of time (i.e., the Active section 502 in FIG. 5A) is called an advertising interval 504. FIG. 5B and FIG. 5C are explained later.

FIGS. 6A to 6D are views for illustrating a detailed configuration of an advertisement packet.

The BLE unit 318 performs an initialization process when it enters a power on state, and after that enters an advertising state for transmitting/receiving advertisement packets. When the advertising state is entered, the BLE unit 318 transmits an advertisement packet illustrated in FIG. 6A to the periphery in a settable interval (i.e., predetermined interval). The advertisement packet is configured by a 2 byte header 601, and a payload 602. The header 601 is a region for storing a type of the packet, information of the size of the payload 602, or the like. The payload 602 is a region that can store information of the apparatus transmitting the advertising signal, and a predetermined size is allocated for it. In the payload 602, other than the device name and installation profile information, information relating to the MFP 200 such as the transmission power (a Tx Power 608) is stored. In the present embodiment, it is assumed that identifying information by which it can be identified whether the job execution by the image processing apparatus is possible is included. As the identifying information, there is capability information 605, setting information 606, and error information 607 which are explained later. In the present embodiment, in the payload 602, an MFP name 603, connection-to-MFP information 604, a NEXT Flag 627, and the Tx Power 608 are stored.

In the payload 602, a name for identifying an MFP is stored in the MFP name 603. Information such as a character string for being able to identify an MFP in an office uniquely, for example, is set as this name. The connection-to-MFP information 604 is information for the mobile terminal 30 to perform a connection to the MFP 200 after having received the advertisement packet. If in compliance with a specification of BLE, a protocol data unit (PDU) described in the BLE 4.0 specification is information is for making a connection to the MFP 200. By transmitting/receiving protocol data PDUs, the mobile terminal 30 is able to perform data communication after establishing a connection with the MFP 200. Also, establishing a connection other than one for BLE is possible, and for example, by setting information for connecting to the WLAN unit 316 as information for performing a connection to the MFP 200, the mobile terminal 30 can make a connection with the MFP 200 by WLAN.

The Tx Power 608 is information indicating a signal strength of Tx. The MFP 200 can identify a propagation loss from information of the Tx Power 608 and the received signal strength of the received packet, and can make an estimation of the distance to the BLE wireless device from this identified propagation loss. For the capability information 605, the setting information 606, and the error information 607 which is state information of the MFP 200, explanation is given later in detail using FIG. 6B, FIG. 6C and FIG. 6D respectively.

Next, using FIG. 6B, a detailed configuration of the capability information 605 is explained. The capability information 605 is capability information for a job that the MFP 200 can execute. The mobile terminal 30, when it receives an advertisement packet that the image processing apparatus broadcasted, can identify what kind of functions the MFP 200 has without establishing a connection with the MFP 200 by receiving the capability information 605.

In the present embodiment, as the capability information 605, there is maker information (hereinafter referred to as a maker 609), model number information (hereinafter referred to as a model number 610), color information (hereinafter referred to as a color 611), and number of inks information (hereinafter referred to as a number of inks 612). Also, as the capability information 605 there is supported sheet size information (hereinafter referred to as supported sheet sizes 613), information of supported sheet types (hereinafter referred to as supported sheet types 614), and information as to whether double-sided printing is possible (hereinafter referred to as double-sided supported 615).

In the maker 609, a maker identification (ID) provided for each maker is stored. In the model number 610, an ID by which a product model of the MFP 200 can be identified uniquely is stored. In the color 611 a flag indicating whether it is a color printer or a monochrome printer is stored. In the number of inks 612 a bit is allocated for each recording material ink color, and the inks that can be mounted can be represented. That is, it is possible to identify the number of inks. For the supported sheet sizes 613, a bit is allocated for each sheet size, and it is possible to represent the sheet sizes that can be set. For the supported sheet types 614, a bit is allocated for each sheet type, and it is possible to represent the sheet types that can be set. In the double-sided supported 615 a flag indicating whether or not double-sided printing is possible is stored. In this way, because it is possible to identify the function of the MFP 200 by the capability information 605, the mobile terminal 30 can determine whether a job for which execution is scheduled can be executed by that MFP.

Next, using FIG. 6C, a detailed configuration of the setting information 606 is explained. The setting information 606 is information set currently in the MFP 200. The mobile terminal 30, by receiving the setting information 606, can identify a current setting state of the MFP 200 without establishing a connection with the MFP 200.

In the present embodiment, as the setting information 606 there is information of a sheet size of the first cassette (hereinafter referred to as the first cassette sheet size 616), and information of a sheet size of the second cassette (hereinafter referred to as the second cassette sheet size 617). Also, as the setting information 606 there is information of a sheet type of the first cassette (hereinafter referred to as the first cassette sheet type 618), and information of a sheet type of the second cassette (hereinafter referred to as the second cassette sheet type 619). Furthermore, as the setting information 606 there is information of a priority cassette (hereinafter referred to as a priority cassette 620), information of a print mode (hereinafter referred to as a print mode 621), and information of a printing speed (hereinafter referred to as a printing speed 622).

In the first cassette sheet size 616 and the second cassette sheet size 617, setting values indicating the sizes of sheets set in the first cassette and the second cassette are stored. These setting values are similar to the bits allocated in the supported sheet sizes 613. In the first cassette sheet type 618 and the second cassette sheet type 619, setting values indicating the sheet types of sheets set in the first cassette and the second cassette are stored. These setting values are similar to the bits allocated in the supported sheet types 614.

In the priority cassette 620, a value indicating the cassette that is used preferentially out of the first cassette and the second cassette is stored. In the case where "1" is stored, the first cassette is used preferentially, and in the case where "2" is stored, the second cassette is used preferentially. For the print mode 621, a value indicating the default print mode is stored. In this value, values indicating various print modes such as "beautiful", "normal", and "fast" can be set. For the printing speed 622, the printing speed in the current print settings is stored. For example, in a case where printing is performed in beautiful mode with A4 sheet size and with normal paper, the estimated number of sheets that can be printed in 1 minute is stored. Note that the printing speed itself may be stored.

In this way, the mobile terminal 30 can identify the current setting information of the MFP 200 and notify the user, and therefore can cue to find an MFP that the user desires. Also, the mobile terminal 30 can identify in advance in a case where the MFP has a desired function but the current settings are different, and notify this. Accordingly, a user can recognize that settings should be changed on the operation unit 709 of the MFP in advance, and the possibility that printing is performed with the wrong settings can be prevented is raised.

Next, using FIG. 6D, a detailed configuration of the error information 607 is explained. The error information 607 is information of an error that occurred in the MFP 200. The mobile terminal 30, by receiving the error information 607, can identify that an error occurred on the MFP without establishing a connection with the MFP 200, and can notify the user.

As the error information 607 there is information of a job status (hereinafter referred to as a job status 623), information of a job error (hereinafter referred to as a job error 624), information of a recoverable error (hereinafter referred to as a recoverable error 625), and information of a fatal error (hereinafter referred to as a fatal error 626).

In the job status 623, information such as a status of a job that the MFP 200 received is stored. For example, the number of received jobs, the number of received pages, and the number of users that exist in the vicinity of the MFP 200 are stored. By identifying the number of received jobs and the number of received pages, the mobile terminal 30 can estimate (identify) approximately what the waiting time will be in a case where a job is transmitted. Also, for the number of users that exist in the vicinity of the MFP 200, the number of mobile terminals in the vicinity of the MFP 200 can be estimated (identified) by broadcasting an advertisement packet and counting the number of responses thereto. Note that the number of users may be simply the number of mobile terminals that return responses or may be the number of mobile terminals within a predetermined distance.

In the job error 624, a value indicating content of an error that occurred when a job is received and executed is stored. In the present embodiment, as the job error, it is possible to identify a sheet size mismatch, a sheet type mismatch, an image decoding error, a packet error, a color mismatch, an imposition error, unsupported processing, or other (errors other than the foregoing). An error often occurs in a case where, for example, the job is incorrect, or setting information of the transmitted job and setting information of the MFP 200 do not match. In other words, often these can be cancelled by re-transmitting an appropriate job from the mobile terminal 30, or by changing a setting of the MFP 200. In the present embodiment, the bits allocated for each job error can be notified if a plurality of errors occurred. The mobile terminal 30 can identify a job error of the MFP 200 based on the job error 624 and notify the user, and therefore the user can determine whether to use that MFP after cancelling the error, or whether to use another MFP.

In the recoverable error 625, a value indicating an error for which maintenance of the MFP 200 by the user is necessary among the errors that occur on the MFP 200 is stored. In the recoverable error 625, a value indicating an error is allocated in each bit similarly to the job error 624. In the present embodiment, as the recoverable error it is possible to identify a conveying unit paper jam, a sheet feeding unit paper jam, sheet tray full, discharging port closed, cover open, an ink outage, ink remaining amount low, and other errors for which maintenance by a user is necessary. By the recoverable error 625, in not only the mobile terminal 30 of the user that transmitted the job, but also in the mobile terminal 30 of users in the periphery, errors can be identified, and therefore it is possible to enhance the maintainability of the MFP 200.

In the fatal error 626, a value indicating an error for which maintenance of the MFP 200 by a user is difficult among the errors that occur on the MFP 200 is stored. An error for which maintenance is difficult is an error for which it is necessary to contact a service center, for example, and which cannot be caused to be recovered from by an ordinary user. In the present embodiment, as the fatal error, a waste ink tank full, a printing unit high temperature error, a power source error, and other errors for which maintenance is difficult can be identified. The mobile terminal 30 can identify and notify that a fatal error occurred on the MFP 200 based on the fatal error. For example, the MFP can notify to the mobile terminal 30 that is executing a job that it is not a usage target.

Here, Tx transmits when broadcasting an advertising signal, but in the present embodiment, if an error occurs on the MFP 200, the power source of the reception circuit is kept off, and a response from a communication partner to the advertising signal is not awaited. Specifically, as illustrated in FIG. 5C, the Rx 509 is eliminated in each channel (channel A-channel C), and only a Tx 512, a Tx 513, and a Tx 514 are executed. With this, while configuration is such that the mobile terminal 30 can identify that the MFP 200 cannot execute printing, it is possible to suppress the power consumption of the MFP 200, and realize power saving. That is, it is possible to reduce the power for turning on the power source of the reception circuit. In the present embodiment, if the fatal error 626 is in the error information 607, Rx is not executed. This is because there is no meaning in receiving a response from the mobile terminal 30 in a case where a fatal error occurs even considering from the side of management of the MFP 200. Note that in cases of the job error 624, the recoverable error 625 or the like, and not just the fatal error 626, configuration may be taken so as to not execute Rx because a job cannot be executed until the error is cancelled.

In this way, the mobile terminal 30 can identify a current state of the MFP 200 by receiving an advertisement packet in which information of the capability information 605, the setting information 606, the error information 607 or the like of the MFP 200 is stored.

Note that the configurations illustrated in FIGS. 5A to 5C are only examples, and it is possible to store arbitrary data in an advertisement packet and broadcast it outside of the content illustrated in FIGS. 5A to 5C. For example, it is possible to arrange the NEXT Flag 627 illustrated in FIG. 6A. The NEXT Flag 627 represents broadcasting information that could not be fully stored in the advertisement packet of this time in a subsequent advertisement packet. Also, information such as a bit that represents a mode for transmitting an arbitrary character string, or the like, and not just that of a predetermined format may be the arranged.

FIG. 7 is a view for illustrating a processing sequence between the mobile terminal 30 and the MFP 200 from advertising to job reception to job completion.

In FIG. 7, the mobile terminal 30 is an initiator that stands by for an advertisement packet from an advertiser in the periphery. Here, the MFP 200 is an advertiser that executes an advertising event of transmitting an advertisement packet in the advertising interval 504. Here, the set of the Tx 508 and the Rx 509 illustrated in FIG. 5A correspond to advertising (step S701-step S703). By the mobile terminal 30 receiving the advertisement packet (FIG. 6A) from the MFP 200, the mobile terminal 30 can identify capabilities and an error state of the MFP 200.

If one of the MFP 200 that is suitable for executing the job exists, the mobile terminal 30 transmits CONNECT_REQ which is a request for transitioning to a connection event for making a network connection (step S704). When the MFP 200 receives CONNECT_REQ, it makes preparations to transition to the connection event. By the BLE unit 318 and the BLE unit 718 notifying LE Connection Complete to the main board 301 and the main board 701 respectively, the mobile terminal 30 and the MFP 200 change to master and slave respectively (step S705 and step S706).

After transitioning to the connection event, the slave MFP 200 establishes a connection with the mobile terminal 30 which is the master. Note that in the BLE standard, the master can form a star-type topology with slaves [1: many].

The MFP 200, after changing to slave, does not broadcast advertisement packets to the mobile terminal 30. For this reason, mobile terminals in the periphery other than the mobile terminal 30 that established the connection with the MFP 200 cannot identify information regarding the MFP 200 via advertising. In contrast to this, in the present embodiment, the mobile terminal 30, by receiving an advertisement packet, can identify capabilities and an error state of the MFP 200 prior to establishing a connection with the MFP 200. Accordingly, it is possible to suppress the mobile terminal 30 establishing a connection with an MFP 200 that cannot execute the job, and it is possible for other terminal devices to identify via advertising information relating to the MFP 200.

In the mobile terminal 30, the main board 701 transmits job data of a print job to the BLE unit 718 (step S707). For the job data here, a print job main body in which image data is embedded may be transmitted, and information of a pointer to a print job may be notified. The BLE unit 718 of the mobile terminal 30 transmits job data of a print job to the BLE unit 318 (step S708). Note, in this embodiment, if pointer information (job information) is transmitted, job data of the print job is transmitted to the BLE unit 318 thereafter, but limitation is not made to this. Configuration may be taken such that the print job main body is transmitted by communication means other than BLE, and configuration may be taken such that, for example, it is transmitted using the WLAN unit 316 which can communicate in a wider range than BLE. In the present embodiment, the print job main body or pointer information is transmitted as information relating to the job.

In the MFP 200, the BLE unit 318 transmits to the main board 301 received job data (step S709). The main board 301 notifies job completion to the BLE unit 318 when it receives the job data (step S710). The timing of notification of job completion may be after the operation of the job completes, or may be the timing at which the reception of job data ends, or may be the timing at which the pointer to the job is notified. Note that if the pointer to the job is notified, for example, the actual data of the job may be obtained using the WLAN unit 316.

In the MFP 200, the BLE unit 318 notifies the received job completion to the BLE unit 718 of the mobile terminal 30 (step S711). The BLE unit 718 notifies the received job completion to the main board 701 (step S712).

After that, the mobile terminal 30 and the MFP 200 respectively return to initiator and advertiser, and the MFP 200 resumes advertising (step S713).

As explained using the sequence of FIG. 7, when the connection event is transitioned to, the advertiser ceases to be able to broadcast advertisement packets. For this reason, the less the connection event occurs, the more mobile terminals in the periphery other than the mobile terminal 30 that established the connection event with the advertiser can receive advertisement packets from the advertiser. Compared to cases in which information relating to the MFP 200 is received after transitioning to the connection event as is conventional, it is possible to notify information relating to the MFP 200 to the mobile terminal only with an advertisement packet broadcast before the connection event. Accordingly, the MFP 200 and the mobile terminal 30 respectively can suppress electric power consumption due to the establishment of the connection in cases where the print job cannot be executed, and the number of steps for cancellation after connecting can be reduced. Also, if there exists a plurality of the mobile terminal 30 in the effective communication range of the MFP 200, it is possible for all of the mobile terminals 30 in the effective communication range to identify a state of the MFP 200 without establishing a connection with the MFP 200.

Using FIGS. 8A and 8B, explanation is given of an example of transmitting a job after searching for the MFP 200 from the mobile terminal 30. FIGS. 8A and 8B are an example of display screens displayed in the display unit 311 of the mobile terminal 30.

The mobile terminal 30, for power consumption reduction, is not put in a state in which it can receive BLE advertisement packets continuously. If a user is trying to print, that is if the user is trying to transmit a print job from the mobile terminal 30, the user activates a predetermined application on the mobile terminal 30. The predetermined application displays an application screen illustrated in FIG. 8A on the display unit 311. This predetermined application has a function of searching for an MFP meeting a desired condition. In the present embodiment, the application screen that the application displays on the mobile terminal 30 has check-boxes for a print mode ("color"), sheet size ("A4 size or greater"), and printing speed ("15 PPM or greater" (the number of sheets that can be printed in one minute)) as conditions for searching for the MFP.

For example, in the case where a print job is an A4 size and there are a large number of sheets, the user instructs the search after having checked the check-boxes for "A4 size or greater" and printing speed of "15 PPM or greater". With this, the BLE unit 718 of the mobile terminal 30 activates, and a state in which advertisement packets in the periphery can be received is set.

Then, the mobile terminal 30 identifies the state of the MFP 200 in the periphery based on the capability information 605, the setting information 606, and the error information 607 when it receives an advertisement packet. Then, as is illustrated in FIG. 8B, a notification screen indicating that MFPs were found is displayed in the display unit 311. Here, the found MFP names, respective statuses, approximate distances from the mobile terminal 30, and a connection button 801 for instructing a connection in a case where the MFP 200 is connected are displayed. In this way, in the present embodiment, the mobile terminal 30 can confirm states of a plurality of the MFP 200 by the advertisement packets.

The CPU 702 of the mobile terminal 30, as described above, can identify a state of the found MFPs by analyzing the received advertisement packets. The mobile terminal 30 may be configured to cause the display as illustrated in FIG. 8B to change based on the identified results. For example, because the printer A has a paper jam error, it cannot execute a print job even if it is connected to, and so configuration is such that the connection button 801 is not displayed. Note that the connection button 801 may be grayed out, or displayed so that it cannot be selected.

By pressing the connection button 801, it is possible to execute a print job by transitioning to a sequence from step S704 of FIG. 7. In this way, the mobile terminal 30 that executes the print job can transmit a print job having filtered out the MFPs that satisfy the condition from out of the MFPs in the periphery. Because the connection event is not transitioned to when filtering out the MFPs that satisfy the condition from out of the MFPs in the periphery, the reception of advertisement packets by other mobile terminals is not impeded.

Figure 9:
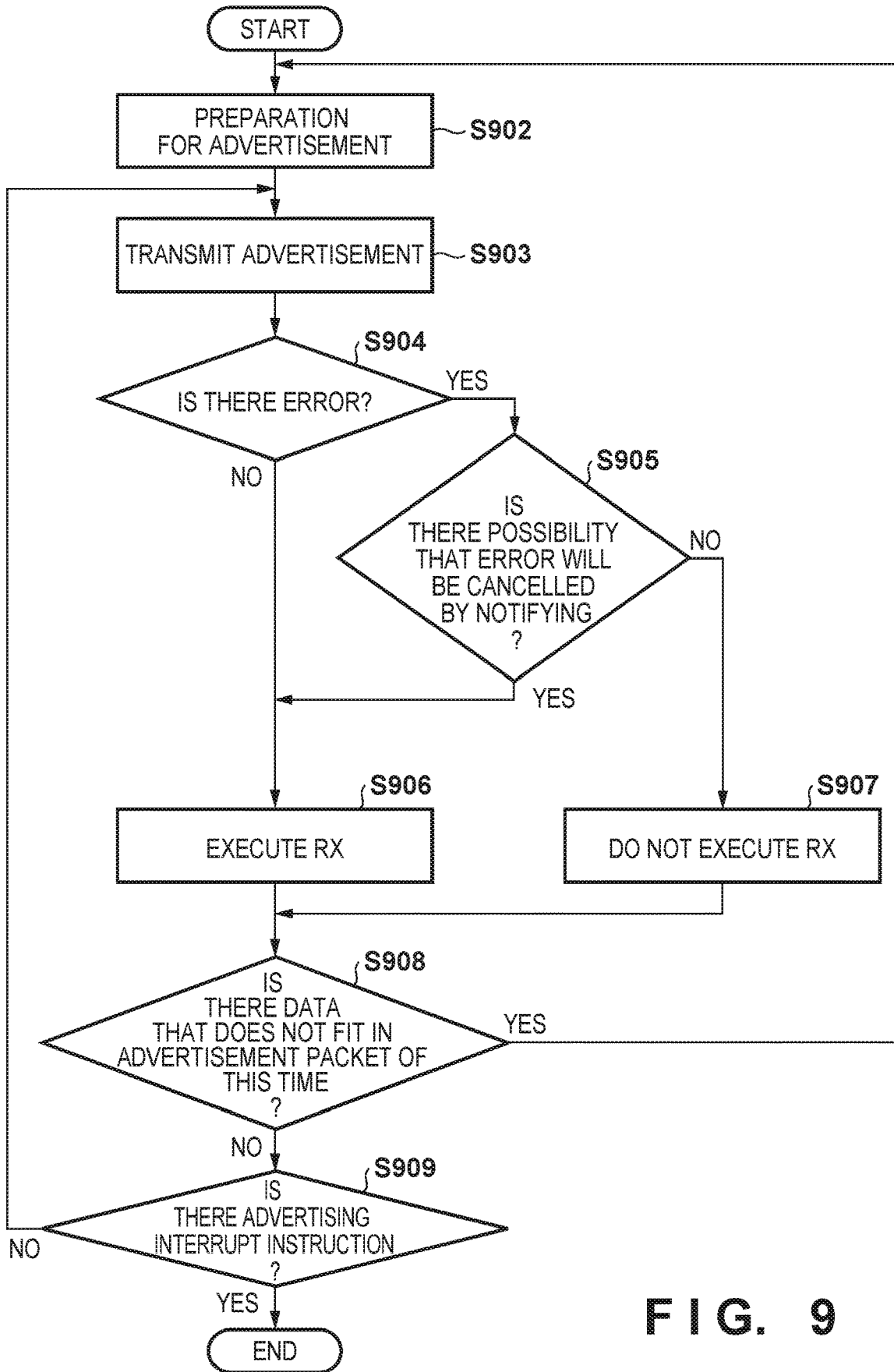
FIG. 9 is a view for illustrating a flow for when advertising is performed.

FIG. 9 is a flowchart for illustrating advertisement packet transmission processing. Note that processing that this flowchart illustrates is realized by the CPU 302 of the MFP 200 reading and executing a program stored in the ROM 303.

In step S902, the CPU 302 performs preparation for broadcasting an advertisement packet. Here, data necessary for generating the payload 602 is obtained from the main board 301. When the advertisement packet is generated, the CPU 302, in step S903, broadcasts the advertisement packet via the BLE unit 318.

In step S904, the CPU 302 determines whether or not there is an error in the MFP 200. This error is the job error 624, the recoverable error 625, or the fatal error 626 of FIG. 6D, for example. If the result of the determination is that there is an error (YES in step S904), the CPU 302, in step S905, determines whether or not the error that occurs is an error for which there is a possibility that it will be cancelled by notifying the user. In the case in which the job error 624 or the recoverable error 625 occur, there is a possibility that the user will perform a recovery operation if the content thereof is notified. Accordingly, in the case of these errors, it is determined that the error has a possibility of being cancelled by notification of the user. On the other hand, in the case where the fatal error 626 occurs, it is determined that the error does not have the possibility of being cancelled by notification of the user because the user cannot resolve the error.

If the result of the determination is that the error has the possibility of being cancelled by notification of the user (YES in step S905), the CPU 302, in step S906, executes the Rx 509 as in FIG. 5A. Meanwhile, if the result of the determination is that the error does not has the possibility of being cancelled by notification of the user (NO in step S905), the CPU 302, in step S907, does not execute the Rx 509 as in FIG. 5C. In other words, the execution of the Rx 509 is prohibited. By controlling in this way, it is possible to suppress the power consumption by omitting Rx when an error that the user cannot resolve occurs. Also, it is possible to explicitly notify the user that the MFP cannot be used.

In step S908, the CPU 302 determines whether or not there is data that does not fit in the advertisement packet of this time. If there is data that does not fit in the advertisement packet (YES in step S908), the processing returns to step S902, and the CPU 302 transmits a subsequent advertisement packet using the NEXT Flag 627. Specifically, as is illustrated in FIG. 5B, as the advertisement packet, transmission is divided over Tx 1 (510) and Tx 2 (511) which are consecutive and are associated by the NEXT Flag 627. By configuring in this way, even in the case of additional information, advertising is performed divided over a plurality of times, and the influence on mobile terminals in the periphery is low compared to in the case where the connection event is performed.

Meanwhile, if the data does not fit in the advertisement packet (NO in step S908), the CPU 302, in step S909, determines whether or not there is an advertising interrupt instruction. If there is no interrupt instruction (NO in step S909), the processing returns to step S903. On the other hand, if there is an interrupt instruction (YES in step S909), processing terminates.

As explained above, by the first embodiment, the mobile terminal 30, by receiving an advertisement packet, can identify capabilities and an error state of the MFP 200 prior to establishing a connection with the MFP 200. Accordingly, it is possible to suppress the mobile terminal 30 establishing of a connection with one of the MFP 200 that cannot execute the job, and it is possible for other terminal devices to identify via advertising information relating to the MFP 200. With this it is possible to suppress the mobile terminal establishing unnecessary connections to image processing apparatuses, and it is possible to make the time in which the mobile terminal establishes a connection with the image processing apparatus shorter. For this reason, when a plurality of mobile terminal users are using an image processing apparatus, the existence of the image processing apparatus becomes easier to recognize.

Second Embodiment

In the second embodiment, explanation is given for an example in which the power source that drives the BLE unit 318 is switched. When an event such as an error occurs in the MFP 200, there are cases in which the power source cannot be input. At that time, if the BLE unit 318 is operating in the main body power source 408, an advertisement packet cannot be broadcast. In the present embodiment, if an event such as an error occurs and the power source cannot be input, the battery 406 is switched to so that it is possible to broadcast advertisement packets. The BLE unit 318 may be implemented to be able to run for several months by a button battery in order to have very low power consumption. By configuring in this way, even if the power source is not input to the MFP 200, a state of the MFP 200 can be notified to the mobile terminal 30. Also, configuration may be taken such that a battery is driven so as to inactivate the power source of the main board 301 or the main body power source 408 for power saving and not just in cases of errors.

Here, for the determination to switch to the battery 406, for example when the microcomputer 403 of the BLE unit 318 monitors a state of the MFP 200, the power source is switched from the main body power source 408 to the battery 406 if a predetermined event occurs.

Other Embodiments

In the above described embodiments, as information of the image processing apparatus, it is assumed that capability information, setting information, and error information is included as an advertisement packet, but limitation is not made to this, and it is possible to configure to have one or more of these pieces of information. Also, it is possible to have other information. For example, if advertisement packets only include the capability information, a mobile apparatus can identify an image processing apparatus that does not have a capability for executing a print job.

Also, in the above described embodiments, explanation was given for an example of a print job as a job that is a processing target, but limitation is not made to this. For example, the MFP 200 may function as a network scanner, an Internet facsimile or the like. For this reason, it is possible to broadcast advertisement packets including information related to these functions (capability information or the like), and to receive various types of jobs such as scan jobs.

In the above described embodiment, if a particular error occurs, the reception circuit power source is kept off, and a response from a communication partner to an advertising signal is not awaited, but limitation is not made to this. In other words, configuration may be taken such that the reception circuit is on in the standby section even if a particular error occurs.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-026970, filed Feb. 13, 2015, which is hereby incorporated by reference herein in its entirety.

What is claimed is:

1. A communication apparatus capable of executing predetermined processing relating to image data, which is able to communicate with an information processing apparatus, the communication apparatus comprising:
   at least one processor configured to cause the communication apparatus to perform operations comprising:
   transmitting an advertising signal using a Bluetooth Low Energy (BLE) communication as a first communication;
   communicating image data with the information processing apparatus via a connection using a second communication which is different from the first communication; and
   determining a state related to a power of the communication apparatus, wherein the communication apparatus is not able to execute the predetermined processing when the state related to the power of the communication apparatus is a first state, and is able to execute the predetermined processing when the state related to the power of the communication apparatus is a second state different from the first state, wherein, in a case where it is determined that the communication apparatus is in the first state, an advertising signal in which a first value that is based on the first state is included in a payload is transmitted using the first communication, wherein, in a case where it is determined that the communication apparatus is in the second state an advertising signal in which a second value different from the first value is included in the payload is transmitted using the first communication, and wherein a first notification is displayed on a display unit of the information processing apparatus based on the first value included in the advertising signal transmitted by the communication apparatus, and the first notification is not displayed on the display unit based on the second value included in the advertising signal transmitted by the communication apparatus.

2. The communication apparatus according to claim 1, wherein
in the case where it is determined that the communication apparatus is in the first state, the advertising signal in which the first value is included in the payload is transmitted before the connection with the information processing apparatus using the second communication is performed.

3. The communication apparatus according to claim 1, wherein
the advertising signal is able to be transmitted even if the communication apparatus is powered off.

4. The communication apparatus according to claim 1, wherein
if it is determined that the communication apparatus is an error state, information according to the error state is transmitted using the first communication.

5. The communication apparatus according to claim 1, wherein
information for performing the connection with the information processing apparatus using the second communication is transmitted using the first communication.

6. The communication apparatus according to claim 1, wherein
the advertising signal includes information relating to a capability of the communication apparatus.

7. The communication apparatus according to claim 6, wherein
the information relating to the capability of the communication apparatus includes information enabling identification functions of the communication apparatus.

8. The communication apparatus according to claim 1, wherein
the advertising signal includes setting information representing a setting state of the communication apparatus.

9. The communication apparatus according to claim 1, wherein
the image data is communicated using the second communication that is able to perform a longer range wireless communication than the first communication.

10. The communication apparatus according to claim 1, further comprising an image sensor, and
wherein the communication apparatus is able to output image data as the predetermined processing.

11. The communication apparatus according to claim 1, wherein
the communication apparatus is a printer, and the image data is included in a print job.

12. The communication apparatus according to claim 1, wherein
the first value is based on an ink set in the communication apparatus.

13. The communication apparatus according to claim 1, wherein
the first value is information based on a paper set in the communication apparatus.

14. The communication apparatus according to claim 1, wherein
the advertising signal is able to be transmitted even if the communication apparatus is in a power saving.

15. The communication apparatus according to claim 1, wherein
the first value is information based on a power state of the communication apparatus.

16. A method of controlling an information processing apparatus which is configured to communicate with a communication apparatus that executes a predetermined processing relating to image data, the method comprising:
obtaining an advertising signal that is transmitted by the communication apparatus using a Bluetooth Low Energy (BLE) communication as a first communication;
performing processing for communicating image data with the communication apparatus via a connection using a second communication which is different from the first communication; and
causing a display unit to display a notification,
wherein, in a case where a state related to a power of the communication apparatus is a first state in which the communication apparatus is not able to execute the predetermined processing, an advertising signal that is transmitted by the communication apparatus using the first communication and in which a first value based on the first state is included in a payload is obtained,
wherein, in a case where it is determined that the state related to the power of the communication apparatus is a second state in which the communication apparatus is able to execute the predetermined processing, an advertising signal that is transmitted by the communication apparatus using the first communication and in which a second value different from the first value is included in the payload is obtained, and
wherein a first notification is displayed on the display unit based on the first value included in the advertising signal transmitted by the communication apparatus, and the first notification is not displayed on the display unit based on the second value included in the advertising signal transmitted by the communication apparatus.

17. The method according to claim 16, wherein
the notification is displayed in response to a user operation.

18. The method according to claim 17, wherein
the advertising signal in which the first value is included in the payload is obtained, before a connection with the communication apparatus based on the second communication is performed.

19. The method according to claim 16, wherein
information that is transmitted by the communication apparatus using the first communication and for performing a connection with the communication apparatus based on the second communication standard is obtained.

20. The method according to claim 16, wherein
the image data is communicated using the second communication that is able to perform a longer range wireless communication than the first communication.

21. The method according to claim 16, wherein
the first value is information based on an ink set in the communication apparatus.

22. The method according to claim 16, wherein
the first value is information based on a paper set in the communication apparatus.

23. The method according to claim 16, wherein
the first value is information based on a power state of the communication apparatus.

* * * * *